United States Patent [19]

Mueggenburg et al.

[11] Patent Number: 5,387,398
[45] Date of Patent: Feb. 7, 1995

[54] SUPERCRITICAL WATER OXIDATION REACTOR WITH WALL CONDUITS FOR BOUNDARY FLOW CONTROL

[75] Inventors: H. Harry Mueggenburg, Carmichael; Donald C. Rousar, Fair Oaks; Marvin F. Young, El Dorado Hills, all of Calif.

[73] Assignee: Aerojet General Corporation, Rancho Cordova, Calif.

[21] Appl. No.: 162,582

[22] Filed: Dec. 3, 1993

[51] Int. Cl.⁶ .............................................. B01D 53/34
[52] U.S. Cl. .................................... 422/168; 239/555
[58] Field of Search ................ 422/168, 176, 182, 224, 422/241, 129; 366/337, 340; 137/896; 239/555; 60/258, 305

[56] References Cited

U.S. PATENT DOCUMENTS

| | | | |
|---|---|---|---|
| 3,413,704 | 12/1968 | Addoms, Jr. et al. | 29/890.09 |
| 3,485,319 | 12/1969 | Balluff | 422/176 X |
| 3,612,397 | 10/1971 | Pearson | 60/258 X |
| 3,615,054 | 10/1971 | Botz | 60/258 X |
| 3,702,174 | 2/1971 | Hankins et al. | 60/258 |
| 3,881,701 | 5/1975 | Schoenmann et al. | 422/244 X |
| 3,914,348 | 10/1975 | Kors et al. | 239/555 X |
| 4,027,407 | 6/1977 | Kiss | 239/555 X |
| 4,081,136 | 3/1978 | Addoms et al. | 60/258 X |
| 4,222,671 | 9/1980 | Gilmore | 366/337 |

OTHER PUBLICATIONS

Steeper, R. R., et al., "Supercritical Water Oxidation of Hazardous Wastes at Sandia National Laboratories," 31st Aerospace Sciences Meeting & Exhibit, American Institute of Aeronautics and Astronautics (AIAA 93-0810), pp. 1-9, Jan. 11-14, 1993.

Barner, H. E., et al., "Supercritical water oxidation: An emerging technology," J. of Hazardous Materials, 31:1-17 (1992).

Bettinger, J. A., et al., "Development and Demonstration of Supercritical Water Oxidation," Technical Paper 93-31, presented at Federal Environmental Restoration Conference, Washington D.C., May 26, 1993, pp. 1-10.

Foy, B. R., et al., "Reactions of Energetic Materials in Supercritical Fluids," 31st Aerospace Sciences Meeting, American Institute of Aeronautics and Astronautics (AIAA 93-0811), pp. 1-12, Jan. 11-14, 1993.

*Primary Examiner*—Robert J. Warden
*Assistant Examiner*—Robert Carpenter
*Attorney, Agent, or Firm*—Townsend and Townsend Khourie and Crew

[57] ABSTRACT

A reactor tube for supercritical water oxidation is designed to supply a thin, continuous layer of water along the inner surface of the reaction zone by a wall lining formed of laminated platelets individually etched and superimposed to form an array of engineered fluid passages through the wall. Each passage includes a flow metering channel of closely controlled configuration to impose a preselected level of resistance to water flowing through it, plus a distribution section which distributes the water emerging from the flow metering channel over the length of a slot-shaped exit port. The exit port is arranged in conjunction with neighboring exit ports in an array over the inner surface of the reactor such that the emerging water forms a continuous film over the surface, thereby protecting the surface from corrosion and salts deposition from the supercritical reaction medium.

25 Claims, 4 Drawing Sheets

SUPERCRITICAL WATER OXIDATION REACTOR WITH WALL CONDUITS FOR BOUNDARY FLOW CONTROL

This invention lies in the field of supercritical water oxidation, and the apparatus in which oxidation in a supercritical water medium is performed.

BACKGROUND OF THE INVENTION

Supercritical water oxidation (SCWO) is the oxidation of waste material in a body of water under conditions above the thermodynamic critical point of water, which is 374° C. and 221 bar ($2.21 \times 10^7$ pascals). Water at supercritical conditions has a density of about one-tenth that of liquid water, and exhibits properties similar to those of a dense gas, including miscibility with organics and combustion gases in all proportions. These qualities result in a single-phase reaction medium containing water, organics and oxidizer(s), allowing oxidation to proceed without the need for mass transport across an interface. As a single-phase reaction medium, supercritical water provides an unusually high level of efficiency in oxidizing organics to harmless oxidation products. Operation under these conditions combines the benefits of high density, which permits high reaction rates at moderate temperatures, with high mass diffusivity and low viscosity. Air pollution problems are minimal compared with thermal incineration, since the operating temperature in a supercritical medium is low enough to prevent any significant formation of $NO_x$ or $SO_2$. Furthermore, any acid gases formed by the oxidation can be neutralized in situ to inorganic salts by the addition of caustic. Since inorganic salts are not soluble in the supercritical water, they precipitate out, which facilitates their removal. When operated effectively, SCWO is applicable to waste water streams containing up to 20% organics by weight, with removal efficiencies in excess of 99.99% at typical reactor conditions of 500° to 650° C. and 250 bar ($2.50 \times 10^7$ pascals) with residence times of 10 to 30 seconds.

Temperature control is important in maintaining the desired reaction rate in SCWO and in preventing $NO_x$ and $SO_2$ formation. Known methods of achieving this include controlling the heating value of the aqueous feed stream, either by diluting the stream with water or adding fuel. Preheating of the feed stream and cooling the reactor are also effective methods of controlling the temperature profile along the reaction flow path.

Two problems which arise in SCWO reactor configurations are the plugging of reactors due to the deposition of inorganic salts on the reactor walls, and corrosion of the reactor walls due to an imbalance in the neutralization. Plugging can be avoided by periodic shutdowns for cleaning, but as in all shutdowns, this considerably lowers the overall operational efficiency. Corrosion can be avoided by the use of corrosion-resistant materials, but these are expensive and in some cases difficult to form into reaction vessels of the desired configurations.

SUMMARY OF THE INVENTION

These and other problems of the prior art are addressed by the present invention, which resides in an elongated reactor tube in which a thin film of clean water is maintained over the reactor surface by an array of engineered fluid passages through the wall. The water is forced through these passages by a pressure differential across the thickness of the tube wall. Segments of each fluid passage which govern the flow of the water are a flow metering channel and a distribution section, the distribution section located downstream of the flow metering channel.

The flow metering channel controls the rate of flow through the fluid passage. Features of the channel such as its cross section, its length, and the number of turns in the channel provide the channel with a preselected level of resistance to water flowing through it under the pressure differential. Precise engineering of this channel to achieve a high level of tolerance in the flow metering channels from one fluid passage to the next provides the reactor with the ability to achieve a high degree of uniformity and continuity in the water film along the wall, and thereby avoid bare spots where the supercritical water in the bulk of the tube cart directly contact the wall. Control of reaction conditions can further be achieved by varying one or more of these features of cross section, length and number of times, from one fluid passage to the next. Varying these features will result in variations in the level of resistance to flow among the channels and hence the flow rates through them. This will be useful in certain embodiments of the invention when it is considered desirable that the water feed rate vary in a preselected manner along the length of the reactor tube. The reaction occurring in the bulk of the reactor tube can for example be optimized in this manner.

The distribution section is a channel of expanding cross section which distributes the water flow along the length of a slot-shaped exit port to form the thin film. Flow diverters in the distribution section assist in the distribution of the flow as the cross section of the channel expands. Each exit port is aligned along the circumference of the reactor tube, and the exit ports of neighboring flow passages are spaced and arranged relative to each other such that the water emerging from all exit ports collectively forms a continuous film along the reactor wall during passage of the supercritical water occupying the bulk space in the interior of the reactor tube.

In preferred embodiments of the invention, each fluid passage further includes a series of orifices or short conduits arranged in parallel upstream of the flow metering channel. These orifices are each of a cross section which is equal to or less than that of the flow metering channel and all water entering the flow metering channel first passes through this series of orifices. The orifices collectively serve as a filter to prevent particulate matter from entering the channel where the particulate matter might obstruct flow through the channel. The orifices function by retaining the particulate matter themselves, permitting water to continue to flow through any remaining, unobstructed orifices in the same series.

The reactor tube wall, or at least the section of the wall in which the fluid passages are formed, is manufactured by known platelet technology. According to this technology, the wall is a laminate of thin sheets bonded together, each sheet having been etched prior to bonding. The etched regions are either etched part way through the thickness of the sheet, thereby forming troughs (depth-etched regions), or etched all the way through the sheet, thereby forming through passages (through-etched regions). Each sheet contains one or both types of etched regions, and the etched regions of neighboring sheets overlap to form the fluid passages referred to above.

These and other features and advantages of the invention are explained in more detail in the sections which follow.

BRIEF DESCRIPTION OF THE DRAWINGS

FIG. 2f depicts only a single platelet.

DETAILED DESCRIPTION OF THE INVENTION AND PREFERRED EMBODIMENTS

While this invention is broad in scope, encompassing a wide range of wall configurations varying in the geometries of the individual fluid passages, the geometric array of fluid passages over the length and circumference of the reactor tube wall, and the configuration of the reactor tube itself, the invention will be best understood by a detailed examination of specific embodiments. The drawings depict one such embodiment.

Figure 1:
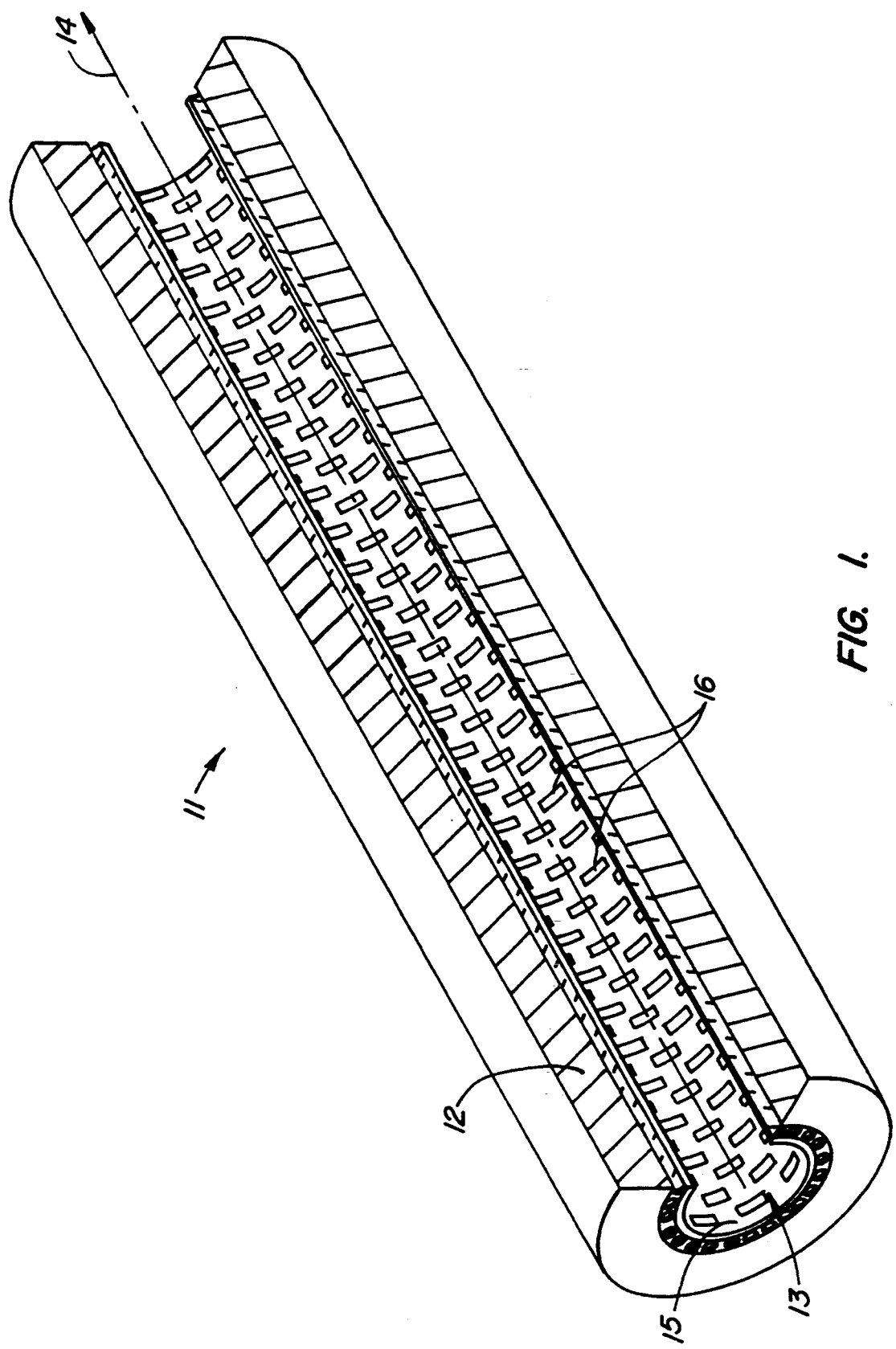
FIG. 1 is a perspective sectional view of a reactor tube illustrative of the present invention.

FIG. 1 shows a section of the reactor tube wall in the region where the continuous film of water is maintained, with a wedge extending over one-fourth of the circumference of the tube cut away to reveal the inner surface of the tube and some of the larger channels in the wall construction. The tube 11 contains a structural outer wall 12 of solid material to provide sufficient strength to retain the elevated pressure inside the tube interior and to provide heat insulation. Along the axis of the tube is a cylindrical passage 13 which forms the reaction zone through which flows the waste stream undergoing oxidation at supercritical conditions. The waste stream in this example follows a direction of flow indicated by the arrow 14.

The inner surface 15 of the tube adjacent to the reaction zone is interrupted by the slot-shaped exit ports 16 of the fluid passages described above in the "SUMMARY OF THE INVENTION," these exit ports forming an ordered array of openings along the tube inner surface. The term "slot-shaped" is used to indicate that, except for the curvature of the tube wall, each exit port is rectangular in shape with one dimension of the rectangle being longer than the other. In the arrangement of these slot-shaped exit ports in the wall surface, the longest dimension of each port is aligned with the tube circumference. The exit slots are preferably arranged on the inner surface of the tube in a staggered array. One example of such an array is shown in FIG. 1. In this example, the slots are arranged in axially aligned rows (i.e., rows running parallel to the tube axis), the rows themselves being staggered relative to each other. The ends of the slots in one row are close to, and optionally in axial alignment with, the ends of the slots in the adjacent row, but the slots of adjacent rows do not overlap. In an alternative arrangement, the axial rows may overlap to achieve staggering in both the axial and circumferential directions. The choice of one staggering arrangement over another for any single tube construction will depend on the dimensions of the exit ports relative to the tube dimensions, on operational considerations such as the temperatures, pressures and flow rates within the reactor and the fluid passages inside the wall, and on manufacturing considerations such as the difficulty or expense involved in fabricating the wall and the integrity of welds used when wall sections are secured to each other. The staggered arrangement shown offers benefits of uniformity for tubes formed with axial welds.

Between the structural outer wall 12 and the reaction zone 13 is a laminated tube wall lining 21. This lining contains all of the channels and fluid passages through which the water is supplied to the exit ports 16 along the inner surface of the reactor tube. A detailed depiction of the lining appears in the enlarged views shown in FIGS. 2a–2f, 3; 4a and 4b.

Figure 2A:
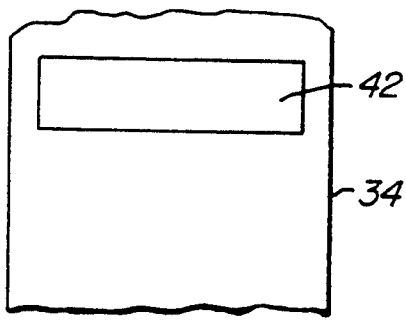
FIGS. 2a through 2e are plan views of sections of individual platelets in a segment of the wall of the reactor tube of FIG. 1.
Figure 2B:
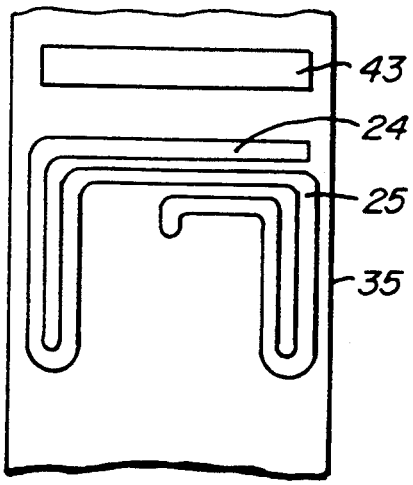

The laminate is formed of platelets etched to form a combination of depressions or indentations and through passages, arranged and overlapped to form the channels which control the flow rate of the water to the exit ports and distribute the water uniformly along the length of each exit port as well as among the totality of exit ports in the array. In the embodiment shown in these drawings, the laminate consists of eight platelets. Individual platelets from a portion of one axial strip of the laminate are shown in FIGS. 2a, 2b, 2c, 2d and 2e, which represent the five innermost platelets, respectively. The platelet shown in FIG. 2e is the platelet which forms the inner surface of the reaction tube, and containing the exit ports 16. The platelet surface visible in each of FIGS. 2a, 2b, 2c, 2d and 2e is the inner surface of each platelet, i.e., the surface facing the axis of the reactor tube. FIG. 2f is the reverse side of the platelet of FIG. 2e, showing the surface facing away from the reactor tube axis. FIG. 3 is an axial cross section of the laminate, showing all eight platelets, taken along the line 3—3 of FIG. 2f. FIGS. 4a and 4b are circumferential cross section, both showing all eight platelets, the cross section of FIG. 4a taken along the line 4a—4a of FIGS. 2c and 3, and the cross section of FIG. 4b taken along the line 4b—4b of FIGS. 2f and 3. FIGS. 2a through 2f and 4 are planar representations of these curved platelets, eliminating the curvature for purposes of clarity.

The segments of the flow path of water through the platelets, in order in the direction of flow toward the exit ports, are as follows:

(a) water feed channels 22, common to all exit ports in one row (visible in FIGS. 4a and 4b, and outlined as dashed lines in FIG. 3);

(b) filter orifices 23 (visible in FIGS. 2c, 3 and 4a), one series per exit port;

(c) collection channels 24 (visible in FIGS. 2b and 3), one per exit port, collecting the discharge from all filter orifices in a single series:

(d) flow metering channels 25 (visible in FIGS. 2b and 3), one per exit port, each fed by collection channels 24;

(e) distribution sections 26 (visible in FIGS. 2e, 2f, 3 and 4b), one per exit port, receiving water emerging from the flow metering channels; and (f) exit ports 16 (visible in FIGS. 2e, 2f and 3) as described above.

The eight platelets in these drawings are numbered 31, 32, 33, 34, 35, 36, 37 and 38. The outermost platelet 31 (FIGS. 3, 4a and 4b) is situated furthest from the reaction zone and adjacent to the structural outer wall 12 (FIG. 1), whereas the innermost platelet 38 forms the wall surface of the reaction zone. The segments of the flow path will now be described in the order in which they occur in the direction of flow.

The water feed channels 22 are formed by indentations or troughs in the outermost platelet 31, through passages or elongated slits in the second-from-outermost platelet 32, and indentations or troughs in the third-from-outermost platelet 33, the slits and troughs all fully aligned. The slits and troughs, and hence the resulting water feed channels 22, are all parallel to the axis of the reactor tube and extend the full length of the portion of the reactor tube over which the array of exit ports extends. Water is supplied to the water feed channels by feed ports (not shown) either at one end of the reactor tube, or at one or more locations along the length of the reactor tube through the structural wall 12 (FIG. 1).

Figure 2C:
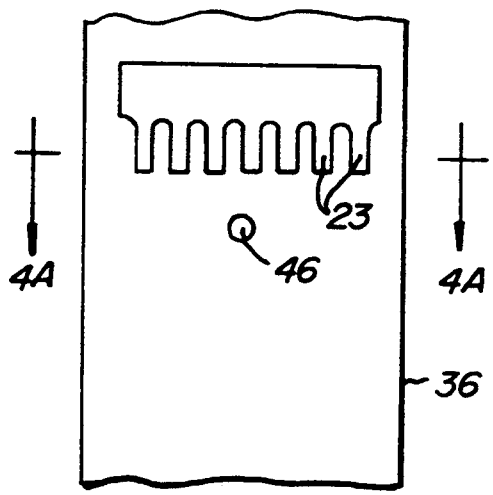
Figure 2D:
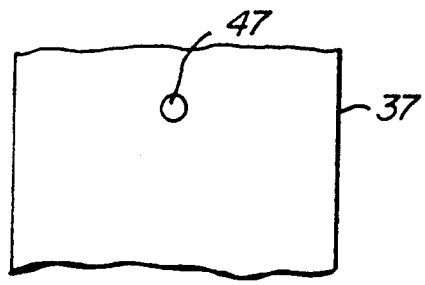
Figure 2E:
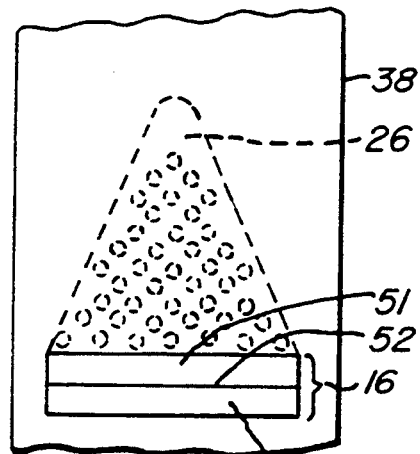
Figure 2F:
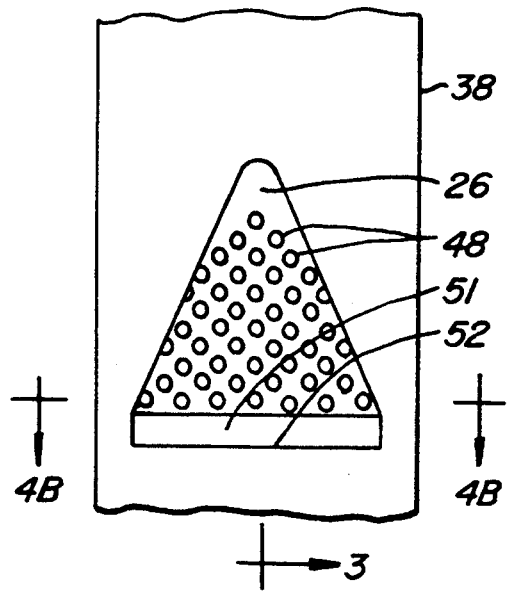
FIG. 2f is a plan view of the reverse side of the platelet section of FIG. 2e.
Figure 3:
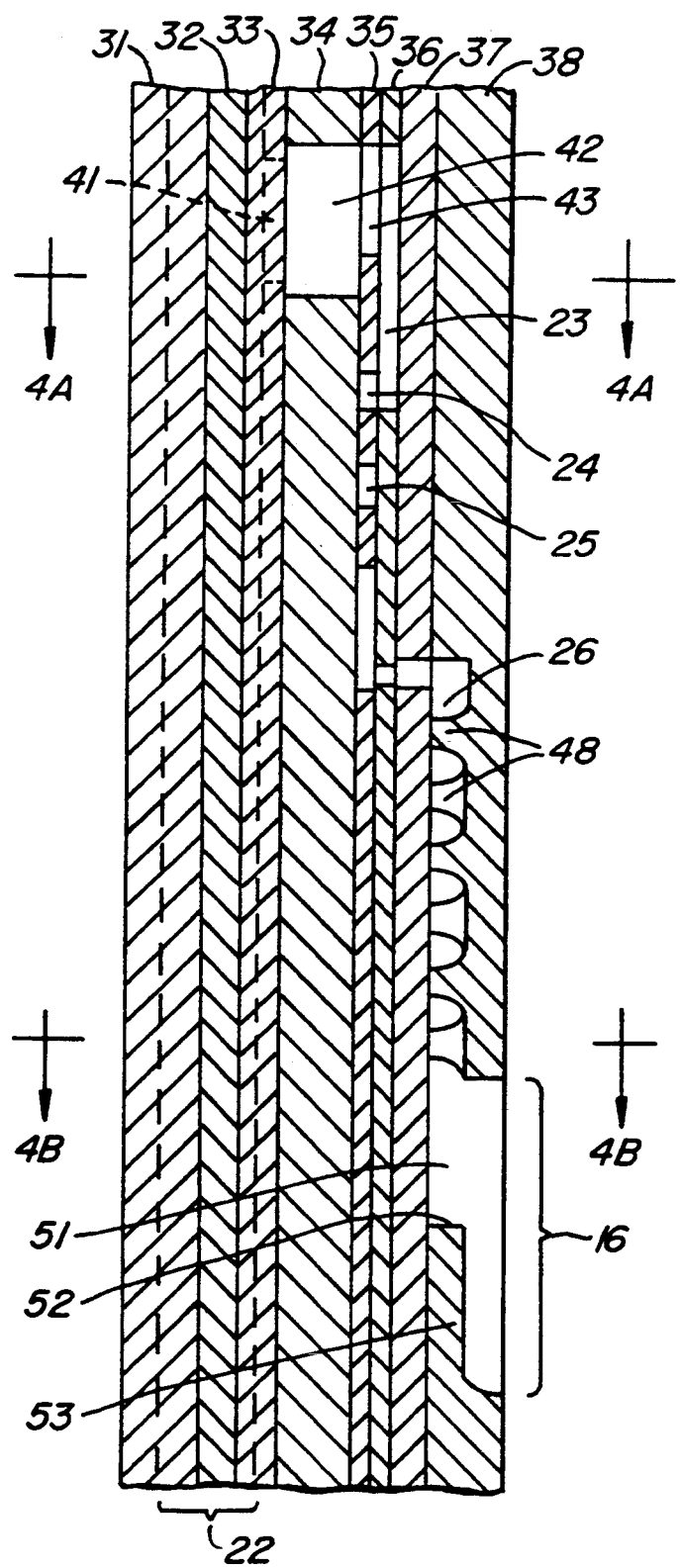
FIG. 3 is a cross section of the laminated inner lining of the reactor tube of FIG. 17 taken along the line 3—3 of FIG. 2f. This is a cross section across the entire laminate, even though
Figure 4A:
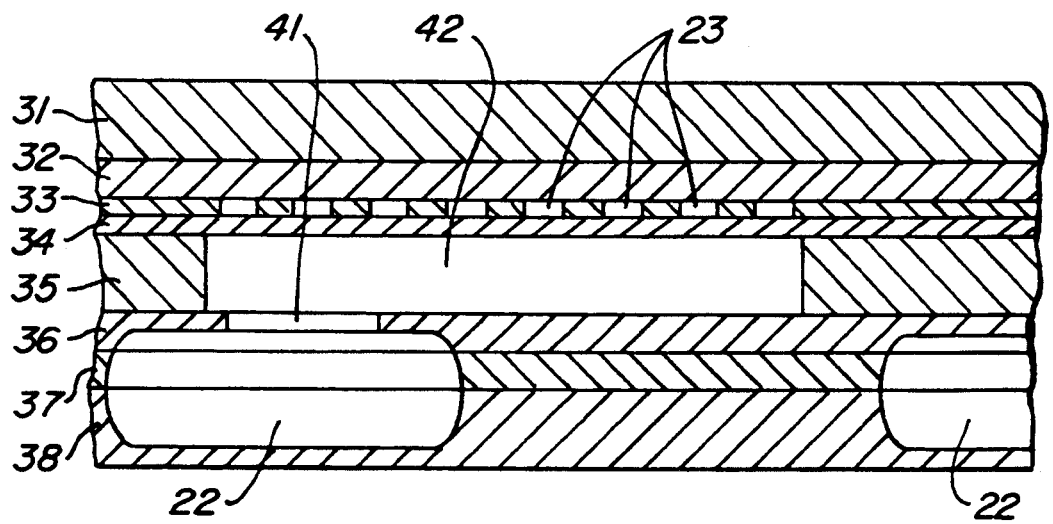
FIG. 4a is a further cross section of the laminated inner lining, taken along the line 4a—4a of FIGS. 2c and 3.
Figure 4B:
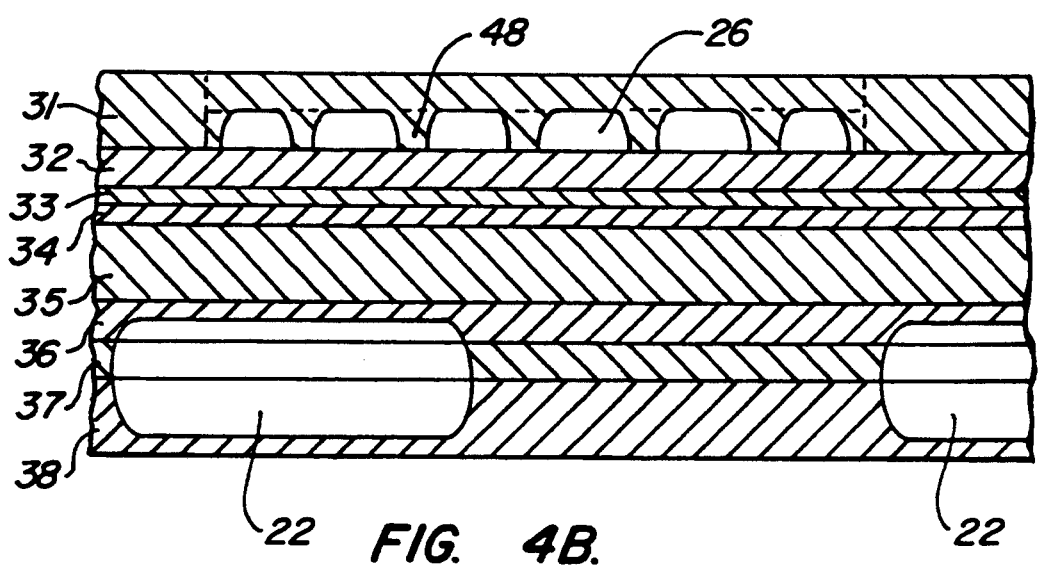
FIG. 4b is a still further cross section, taken along the line 4b—4b of FIGS. 2f and 3. These are also cross sections across the entire laminate.

Spaced periodically along the lengths of the water feed channels 22 are connecting passages (FIGS. 3 and 4a) through which water passes from the water feed channels into the filter orifices 23 (FIGS. 2c, 3 and 4a). These passages consist of through-etched areas 41 in the third-from outermost platelet 33, formed by etching through the remainder of this platelet, and wider through-etched areas 42, 43 in the fourth-from-outermost and fifth-from-outermost platelets 34, 35, respectively, these wider areas extending the width of the entire series of orifices to feed all orifices directly. The orifices 23 themselves are etched-through openings in the sixth-from-outermost platelet 36. These etched-through openings, together with the facing surfaces of the adjacent platelets on both sides, form short channels arranged in parallel, each to serve as a separate feed conduit for a common collection channel 24, which is formed as an etched-through passage in the fifth-from-outermost platelet 35. The collection channel 24 runs transverse to the short channels and overlaps them at their downstream ends, thereby collecting the water from them at these ends. Each short channel thus serves as a bypass for each of the others, and if any of these short channels become plugged or obstructed by particulate matter from the water flow, the flow through the remaining channels will continue to feed the collection channel and hence the flow metering channel 25 downstream without interruption.

The number of orifices per flow metering channel is not critical and may vary considerably, provided that the number exceeds one by a sufficient amount to provide the overall flow passage with adequate longevity before all orifices in a series become plugged. It is preferred that each series includes at least three such orifices, more preferably at least six. In presently preferred embodiments, there are either seven, eight or twelve such orifices per flow metering channel.

The collection channel 24 and the flow metering channel 25 are formed by an through-etched region in the fifth-from-outermost (third-from-innermost) platelet (FIG. 2b). The flow metering channel 25 is a single, continuous, unbranched channel, preferably of constant cross section throughout its length. The shear forces exerted by the wall of this narrow channel on the water passing through it offer the major portion of the flow resistance encountered by the water in its travel to the exit port. The length, width and configuration or shape of each of these flow metering channels among the various exit ports are all easily controlled by the etching process, while the depth is easily controlled by the platelet thickness. This ability to control the length, cross section and number of turns permits close control over the flow resistance, and hence over the rates at which the water emerges from each of the exit ports. The turns will most conveniently be 90° or greater, preferably 90°, 180° or both, and the number of these turns may be the same along the entire length of the water-film-covered wall of the reactor tube, or it may vary along the tube length, as desired. In certain applications, it will be beneficial to provide a varying rate of supply to the water film, and in particular a rate which increases along the direction of flow through the reaction zone. Since the water film can be used to impose temperature control on the supercritical reaction mixture, there will in certain embodiments of the invention be a greater need for such control as the reaction progresses along the length of the tube. The need may also arise from an increasing amount of salts suspended in the reaction medium as the medium progresses through the tube, and hence an increasing amount of water supply to the film to prevent deposition of the salts. Regardless of whether the level of flow resistance through the flow metering channel is constant along the length of the tube or variable, there will be at least one turn of at least 90° in the channel, and preferably between one and ten such turns. The cross section of the flow metering channel will be either approximately the same (in width and depth) as that of the orifices 23 or larger, in either case so that the orifices will serve effectively as filtering means.

The distribution section 26 in this embodiment is formed by an indentation which is depth-etched into the innermost platelet 38, on the side opposite the side exposed to the reaction. The platelet 37 which is adjacent to the innermost platelet 38 on its outer side forms the outer wall of the distribution section. Aligned openings 46, 47 in the next two adjacent platelets 36, 37 (FIGS. 2c and 2d, respectively) permit passage of water from the flow metering channel 25 into the distribution section. The distribution section 26 is triangular in shape with the aligned openings 46, 47 in alignment with one apex of the triangle. The flow cross section thus expands from that apex of the triangle to the elongated exit port 16 at the side opposite the apex.

The distribution section 26 contains an array of islands 48 serving as flow diverters to promote an even distribution of the flow along the width of the section as the width expands to equal the long dimension of the exit port. The islands are formed by unetched areas in the platelet, and they are arranged in a staggered array to force the water to follow a convoluted path through the section. Alternative means of promoting a uniformly expanding flow distribution are those involving the use of flow diverters or channels of other shapes and configurations. Elongated barriers transverse to the flow direction may be used, for example, serving as baffles over which the water flows as a cascading sheet, alternating back and forth in directions perpendicular to the plane of FIG. 2. Further alternative means may involve the use of flow-expanding orifices arranged to expand the flow in the direction parallel to the planes of the platelets. Still further alternatives will be readily apparent to those skilled in the art.

The exit ports 16 in the structure shown in the drawings are passages formed by through-etched areas 51 of the innermost platelet 38 (FIGS. 2e, 2f and 3). The water approaching the exit ports from the distribution sections flows in a direction parallel to the reactor tube wall. For the exiting water to form a continuous film over the inner wall surface upon leaving the exit ports, it is necessary that any diversion of the flow outward from the wall surface is minimal. Accordingly, in the embodiment shown in the drawings, the downstream edge 52 of the through-etched area has a stepwise profile, formed by etching a portion 53 of the platelet only part of the way through (FIGS. 2e and 3), this portion being immediately below the etched-through area 51.

The laminates of the present invention may be formed by conventional techniques for etching metals and forming metal laminates. Common photo-etching techniques involve the use of masks applied to the individual layers (or platelets) prior to lamination, either by stencils or by photographic techniques. This is followed by chemical etching through the masks, then by removal of the masks. Lamination of the platelets is then achieved by either diffusion-bonding, roll-bonding, brazing, or other conventional techniques for laminated metals. Diffusion-bonding, which is a particularly effective method for this application, involves hot-pressing the platelets together, using pressures typically in the range of 6.9 to 20.7 MPa (1000 to 3000 psi) and temperatures typically in the range of 455°–540° C. The individual platelets themselves may be made of any material which can be formed into appropriately thin sheets, which is susceptible to etching and diffusion-bonding, and which is preferably corrosion-resistant to at least a moderate degree under the conditions to be encountered in supercritical water oxidation. Examples of metallic materials which meet this description are aluminum and steel. High corrosion resistance is not necessary, since most of the tendency to corrosion will be eliminated by the thin film of water distributed over the reactor surface in accordance with the invention.

The platelets may vary in thickness, and the thicknesses of particular platelets are not critical to the invention. In most cases, however, it is contemplated that platelets having thicknesses less than about 0.025 inch (0.064 cm) per platelet will be used. Preferably, the platelet thicknesses will fall within the range of about 0.001 inch (0.0254 cm) to about 0.025 inch (0.064 cm). The aggregate of the platelets, and thus the laminated lining of the reaction tube, is of a thickness which is preferably less than about 0.3 inch (0.762 cm), more preferably about 0.03 inch (0.0762 cm) to about 0.3 inch (0.762 cm), and most preferably from about 0.05 inch (1.27 cm) to about 0.2 inch (0.51 cm). In a presently preferred embodiment of the invention using the structure shown in the drawings, the innermost and outermost platelets (31 and 38) and the fourth platelet from the outer side (34) are each approximately 0.020 inch (0.051 cm) in thickness, the second and third platelets from the outer side (32 and 33) are each approximately 0.010 inch (0.0254 cm) in thickness, and the fifth and sixth platelets from the outer side (36 and 37) are each approximately 0.005 inch (0.013 cm) in thickness.

The flow metering channel 25, as mentioned above, may vary in cross section and length, and the values of these parameters for any particular flow metering channel are not critical to the invention. In most applications, however, it is contemplated that the flow metering channel will have a cross-sectional area of less than about $1 \times 10^{-3}$ square inch ($6.45 \times 10^{-3}$ square centimeter). In preferred embodiments, the cross-sectional area will fall within the range of about $0.01 \times 10^{-3}$ square inch ($0.0645 \times 10^{-3}$ square centimeter) to about $1 \times 10^{-3}$ square inch ($6.45 \times 10^{-3}$ square centimeter), and in particularly preferred embodiments, the cross-sectional area will fall within the range of about $0.01 \times 10^{-3}$ square inch ($0.0645 \times 10^{-3}$ square centimeter) to about $0.20 \times 10^{-3}$ square inch ($1.29 \times 10^{-3}$ square centimeter). Likewise, the length of the flow metering channel will preferably range from about 0.01 inch (0.0254 cm) to about 3 inches (7.62 cm), and most preferably from about 0.1 inch (0.254 cm) to about 2 inches (5.08 cm). In a presently preferred embodiment of the structure shown in the drawings, the flow metering channel is 0.010 inch (0.0254 cm) in width, 0.005 inch (0.0127 cm, the thickness of the platelet 36) in depth, and approximately one inch (2.54 cm) in length.

Other dimensions of potential interest relative to the uniformity of the film of water are the length of the longest dimension of the slot-shaped exit ports 16 and the ratio of this length to the circumference of the inner surface of the reaction tube. Although these values are not critical to the invention and may vary, a preferred range for the longest dimension of each exit port is from about 0.05 inch (0.127 cm) to about 0.5 inch (1.27 cm), and a more preferred range is from about 0.1 inch (0.254 cm) to about 0.3 inch (0.762 cm). Similarly, a preferred range for the ratio of the longest dimension of each exit port to the circumference of the inner surface of the reaction tube is about 0.003:1 to about 0.3:1, with a more preferred range of from about 0.01:1 to about 0.1:1. In the presently preferred embodiment referred to above, the longest dimension of the exit port is about 0.2 inch (0.508 cm), the depth of the distribution section 26 and hence the depth or short dimension of the exit port is about 0.01 inch (0.0254 cm), the stepwise trailing edge is comprised of two steps each 0.01 inch (0.0254 cm) in depth, and the axial lengths of both the through-etched passage upstream of the first step 52 and the depth-etched intermediate landing 53 between the steps are each 0.050 inch (0.127 cm).

Still other dimensions of potential interest are the degree of expansion of the flow cross section in the distribution section 26, the axial distance between successive exit ports 16, and the dimensions of the reaction tube itself. None of these are critical to the invention, and all may vary. In preferred embodiments of the invention, the expansion ratio of the flow cross section in the distribution section is at least about 10:1, and in further preferred embodiments, from about 10:1 to about 50:1. The axial distance between axially adjacent exit ports in preferred embodiments is from about 0.1 inch (0.254 cm) to about 1.0 inch (2.54 cm), and most preferably from about 0.25 inch (0.64 cm) to about 0.6 inch (1.52 cm). The inner diameter of the reaction tube is preferably from about 0.5 inch (1.27 cm) to about 5 inches (12.7 cm), and most preferably from about 1 inch (2.54 cm) to about 3 inches (7.62 cm).

Operating conditions for a reactor tube of the type described herein may vary. In general, temperatures and pressures within the ranges described above in the "BACKGROUND OF THE INVENTION" may be used. In most applications, the pressure drop from the water feed channels 22 to the exit ports 16 will be from about 50 psi to about 500 psi. The water itself is preferably deionized water, or any other appropriately cleaned water, and the feed pressure may be on the order of 4000 to 5000 psi.

The reactor tube of the invention may be supplemented by a preheating section upstream of the section in which the oxidation reaction occurs. In this preheating section, water from the same source as the water used to form the continuous film in the reaction section (and supplied by the same water feed channels 22) is directed into the bulk of the reaction medium to raise the temperature of the medium to the supercritical range. This preheating technique offers considerable advantages over external heating methods of the prior art, which use heating wire or tape to heat the tube exterior in this section of the tube which is particularly vulnerable to salt precipitation. Channels to direct the water in this manner can be formed in the wall by platelets which are continuations or extensions of the platelets forming the wall lining in the reaction section. The platelets in the preheating section will be etched in patterns different from those in the reaction section, to form cause the water passing through them to enter the reaction space as radially directed jets of heated water. Water from these jets will penetrate into the bulk of the reaction medium, thereby mixing with the reaction medium and raising its temperature. Channels to produce jets of this type can vary considerably in shape, direction, and configuration. One example of a configuration which will achieve effective preheating is a straight, radially oriented channel with a length-to-diameter ratio of from about 5:1 to about 10:1.

Further variations of the reaction tube and flow configurations will be readily apparent to those skilled in the art. For example, additional channels for the supplemental feed of oxidizer may be included at specified distances along the length of the reaction tube as a means of controlling the reaction temperature as the reaction progresses. Other means of controlling the temperature profile along the reaction flow path as well as the composition of the reaction mixture will be readily apparent to those skilled in the art.

The foregoing is offered primarily for purposes of illustration. It will be readily apparent to those skilled in the art that the number and arrangement of flow passages, the dimensions, both absolute and relative, of the various passages and components of the apparatus, the materials, operating conditions, procedural steps and other parameters of the system described herein may be further modified or substituted in various ways without departing from the spirit and scope of the invention.

What is claimed is:

1. A reactor tube for supercritical water oxidation, comprising:

a source of water, an elongate tube having a tube wall comprised of a laminate of platelets, each platelet less than about 0.100 inch in thickness and etched in a pattern such that the etched regions of all platelets overlap to form a plurality of flow passages communicating the exterior of said tube wall with the interior thereof, each said flow passage defining a direction of flow toward said interior and each said flow passage comprising:

a flow metering channel of substantially uniform cross section and elongate and unbranched in shape, the length and cross section of said flow metering channel selected to offer a preselected resistance to flow therethrough, said flow metering channel in fluid communication with said source of water, and a distribution section to receive water emerging from said flow metering channel and causing said water to flow in directions parallel to said tube wall, said distribution section having a cross section expanding in said direction of flow and terminating in an elongate exit port which is transverse relative to lift elongate tube and shaped to direct said water to flow in a sheet along the interior of said tube wall, said distribution section containing flow diverters to distribute said water substantially uniformly over the width of said elongate exit port, the elongate exit ports of all said flow passages being arranged to supply water along the interior of said tube wall in a substantially continuous film.

2. A reactor tube in accordance with claim 1 in which said expanding cross section of said distribution section expands said cross section by a cross section area ratio of at least about 10:1.

3. A reactor tube in accordance with claim 1 in which said expanding cross section of said distribution section expands said cross section by a cross section area ratio of from about 10:1 to about 50:1.

4. A reactor tube in accordance with claim 1 in which said flow metering channel has a cross section of less than about $1 \times 10^{-3}$ square inch.

5. A reactor tube in accordance with claim 1 in which said flow metering channel has a cross section of from about $0.01 \times 10^{-3}$ square inch to about $1 \times 10^{-3}$ square inch.

6. A reactor tube in accordance with claim 1 in which said flow metering channel has a cross section of from about $0.01 \times 10^{-3}$ square inch to about $0.20 \times 10^{-3}$ square inch.

7. A reactor tube in accordance with claim 1 in which said flow metering channel has a length of from about 0.01 inch to about 3 inches.

8. A reactor tube in accordance with claim 1 in which said flow metering channel has a length of from about 0.1 inch to about 2 inches.

9. A reactor tube in accordance with claim 1 in which said flow metering channel has at least one change of direction of at least 90°.

10. A reactor tube in accordance with claim 1 in which said flow metering channel has from one to ten changes of direction of at least 90°.

11. A reactor tube in accordance with claim 1 in which each platelet of said laminate is less than about 0.025 inch in thickness.

12. A reactor tube in accordance with claim 1 in which said platelets of said laminate range in thickness from about 0.001 inch to about 0.025 inch.

13. A reactor tube in accordance with claim 1 in which each said elongate exit port is rectangular in shape with its longest dimension circumferentially oriented relative to said elongate tube, and said longest dimension is from about 0.003 to about 0.3 times the circumference of said tube.

14. A reactor tube in accordance with claim 13 in which said longest dimension is from about 0.01 to about 0.1 times the circumference of said tube.

15. A reactor tube in accordance with claim 13 in which said longest dimension is from about 0.05 inch to about 0.5 inch.

16. A reactor tube in accordance with claim 13 in which said longest dimension is from about 0.1 inch to about 0.3 inch.

17. A reactor tube in accordance with claim 1 in which said laminate is less than about 0.3 inch in thickness.

18. A reactor tube in accordance with claim 1 in which said laminate is from about 0.03 inch to about 0.3 inch in thickness.

19. A reactor tube in accordance with claim 1 in which said laminate is from about 0.05 inch to about 0.2 inch in thickness.

20. A reactor tube in accordance with claim 1 in which said elongate tube has an inner diameter of from about 0.5 inch to about 5 inches, and said elongate exit ports are spaced from each other along the axis of said elongate tube by a distance of from about 0.1 inch to about 1.0 inch.

21. A reactor tube in accordance with claim 1 in which said elongate tube has an inner diameter of from about 1 inch to about 3 inches, and said elongate exit ports are spaced from each other along the axis of said elongate tube by a distance of from about 0.25 inch to about 0.6 inch.

22. A reactor tube in accordance with claim 1 in which a flow direction through each of said flow passages is defined as the direction from said flow metering channel to said distribution section, and each of said flow passages further comprises a plurality of filtering channels arranged in parallel, upstream of said flow metering channel according to said flow direction, each said filtering channel having a cross section substantially equal to or less than that of said flow metering channel and all discharging into said flow metering channel.

23. A reactor tube in accordance with claim 1 in which said flow metering channels vary in shape among said flow passages such that said preselected resistance to flow varies axially along said elongate tube.

24. A reactor tube in accordance with claim 23 in which at least a portion of said flow metering channels each contain at least one change of direction of at least 90°, and said flow metering channels vary in at least one member selected from the group consisting of length and number of changes of direction.

25. A reactor tube in accordance with claim 23 in which at least a portion of said flow metering channels each contain at least one change of direction of at least 90°, and said flow metering channels vary in both length and number of changes of direction.

* * * * *